United States Patent [19]
King et al.

[11] Patent Number: 5,500,310
[45] Date of Patent: Mar. 19, 1996

[54] HOLOGRAPHIC FLAKE PIGMENT

[75] Inventors: James G. King, Birgminham, Mich.; Steven R. Mackara, New Castle, Del.; Daniel J. Mickish, Wilmington, Del.; David L. Spooner, Wilmington, Del.

[73] Assignee: E. I. Du Pont de Nemours & Company, Wilmington, Del.

[21] Appl. No.: 366,273

[22] Filed: Dec. 29, 1994

Related U.S. Application Data

[62] Division of Ser. No. 148,448, Nov. 8, 1993, Pat. No. 5,415,950.

[51] Int. Cl.$^6$ ..................... G03H 1/02
[52] U.S. Cl. ................. 430/1; 430/2; 430/290; 106/401; 106/493; 106/20 R; 106/22 R; 106/14.41; 106/14.11; 359/1; 359/3
[58] Field of Search ............... 430/1, 2, 290, 430/281, 270, 11, 10; 359/1, 3, 2; 283/86, 93; 106/401, 493, 20 R, 22 R, 14.41, 14.11; 524/520, 524, 563, 544, 545, 546

[56] References Cited

U.S. PATENT DOCUMENTS

| | | | |
|---|---|---|---|
| 4,069,186 | 1/1978 | Ramig | 524/524 |
| 4,547,002 | 10/1985 | Colgate, Jr. | 283/91 |
| 4,878,719 | 11/1989 | Wreede et al. | 359/24 |
| 4,942,102 | 7/1990 | Keys et al. | 430/1 |
| 4,942,112 | 7/1990 | Monroe et al. | 430/282 |
| 4,959,283 | 9/1990 | Smothers et al. | 430/1 |
| 4,959,284 | 9/1990 | Smothers et al. | 430/2 |
| 4,963,471 | 10/1990 | Trout et al. | 430/282 |
| 4,978,593 | 12/1990 | Yin et al. | 430/2 |
| 5,006,413 | 4/1991 | Den Hartog et al. | 524/507 |
| 5,087,510 | 2/1992 | Tokas et al. | 428/209 |
| 5,100,735 | 3/1992 | Chang | 428/515 |
| 5,128,779 | 7/1992 | Mallik | 359/2 |
| 5,161,829 | 11/1992 | Detrick et al. | 283/91 |
| 5,278,008 | 1/1994 | Moss et al. | 430/1 |
| 5,415,950 | 5/1995 | King et al. | 430/1 |

FOREIGN PATENT DOCUMENTS 58-200275(A)  11/1983  Japan.
WO89/01016  2/1989  Japan.

*Primary Examiner*—Charles L. Bowers, Jr.
*Assistant Examiner*—M. J. Angebranndt
*Attorney, Agent, or Firm*—Hilmar L. Fricke

[57] ABSTRACT

Holographic flake pigments, processes for making the pigments, decorative coatings comprising the pigments, and articles comprising the decorative coatings are disclosed. The pigment comprises particles that (1) comprise an organic polymer and further comprise one or more volume phase holograms; and (2) have a thickness of about 1 micrometer to about 100 micrometers, an average diameter of about 10 micrometers to about 300 micrometers, and a thickness to diameter ratio of about 1:2 to about 1:60.

7 Claims, 3 Drawing Sheets

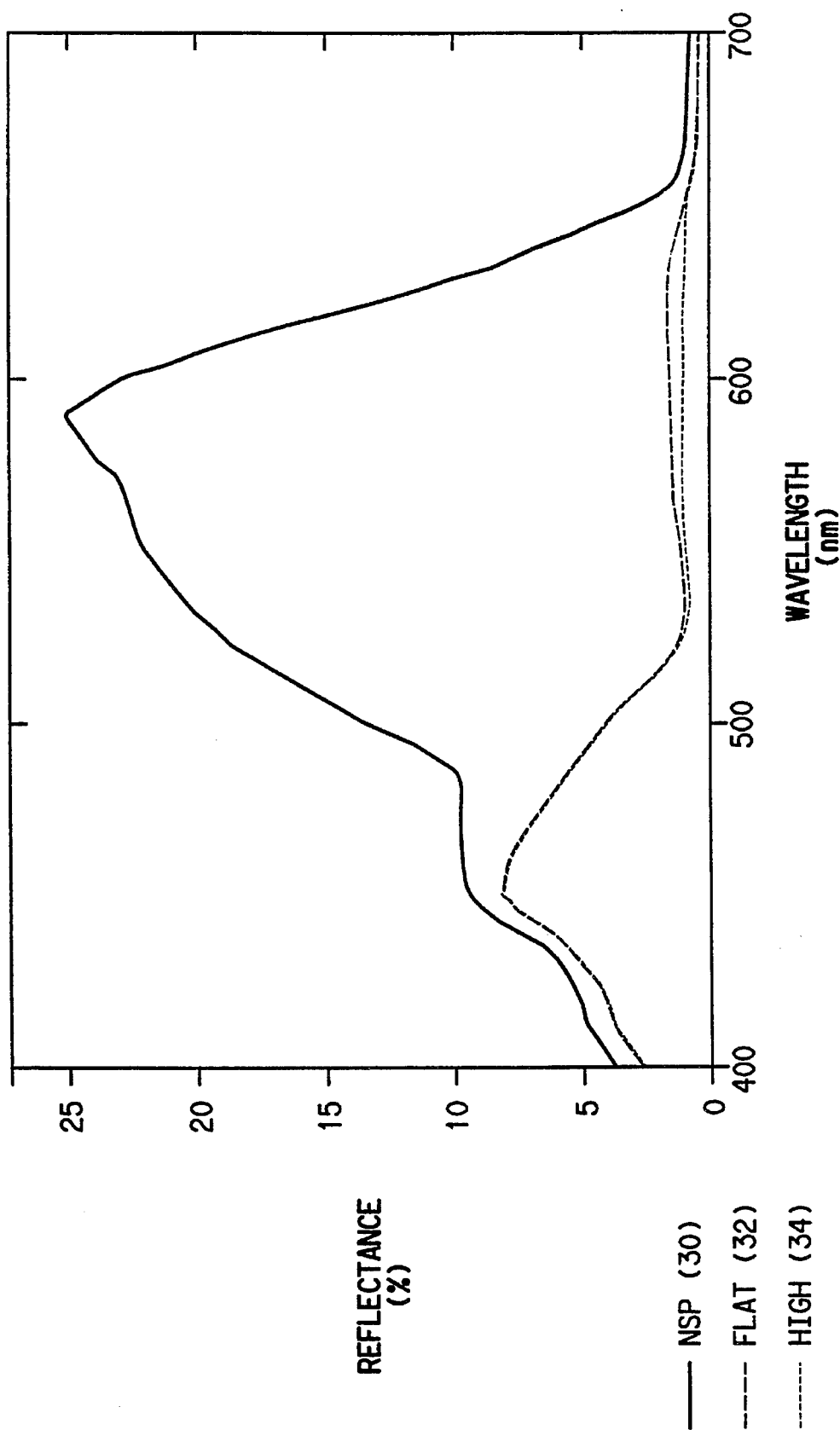

HOLOGRAPHIC FLAKE PIGMENT

This is a division of application Ser. No. 08/148,448, filed Nov. 8, 1993 now U.S. Pat. No. 5,415,950.

FIELD OF THE INVENTION

This invention relates to pigments for decorative coatings. More particularly, this invention relates to holographic flake pigments and compositions containing such pigments.

BACKGROUND OF THE INVENTION

Reflective and pearlescent flake pigments are used in decorative coatings to provide aesthetically pleasing effect because of both sparkle and "flop". "Flop" is a polychromatic effect whereby, due to the presence of the pigment, a lighter color is evident to the eye when the coated surface is viewed perpendicularly than when viewed at low angle. These variations emphasize the lines and contours of a three dimensional surface.

The weathering resistance of many decorative coatings can be adversely affected by the presence of a reflective pigment or pearlescent pigment. Many synthetic polymers used in coatings are degraded by exposure to the ultraviolet light present in sunlight. Whereas most pigments absorb ultraviolet light, reflective pigments scatter and reflect ultraviolet light throughout the polymer matrix of the coating, increasing its exposure to ultraviolet light. Pearlescent pigments absorb ultraviolet light and catalyze photo-degradation of the polymer matrix of the coating Reflective flake pigments are typically flakes of metal, such as aluminum, nickel, or steel. Pearlescent pigments are typically mica flakes coated with metal oxides. Certain of these materials are subject to attack by corrosive atmospheres, producing spotting and/or staining of the coating. Metals and metal oxides can enhance photodegradation of the polymer matrix. In addition, these materials may be difficult to disperse in the paint vehicle.

SUMMARY OF THE INVENTION

The invention is a holographic flake pigment, the pigment comprising particles that (1) comprise an organic polymer and further comprise one or more volume phase holograms; (2) have a thickness from about 1 micrometer to about 100 micrometers; (3) have an average diameter of about 10 micrometers to about 300 micrometers, wherein said average diameter of the particles is defined to be that which is determined by sieving operations and which is expressed in micrometers; and (4) the thickness to diameter ratio of said flake particles is about 1:2 to about 1:60.

In another embodiment this invention is a process for preparing a holographic flake pigment, said process comprising:

(A) holographically exposing a layer of photosensitive composition to record a volume phase hologram, said photosensitive composition comprising a monomer, a binder, and a photoinitiator system, wherein said binder is present in sufficient amount to form a film when the composition is coated; said photoinitiator system is present in sufficient amount to initiate polymerization of the monomer on exposure to actinic radiation; and said monomer is present in sufficient amount to produce image differentiation on polymerization, and (B) converting said volume phase hologram to particles that have a thickness of about 1 micrometer to about 100 micrometers, an average diameter of about 10 micrometers to about 300 micrometers, and a thickness to diameter ratio of about 1:2 to about 1:60.

In another embodiment the invention is a fluid coating composition adapted for the preparation of decorative coatings; the composition contains (a) a liquid medium; (b) a film forming polymer; and (c) a pigment dispersed in said medium, the improvement wherein:

the pigment comprises particles that (1) comprise an organic polymer and further comprise one or more volume phase holograms; and (2) have thickness of about 1 micrometer to about 100 micrometers, an average diameter of about 10 micrometers to about 300 micrometers and a thickness to diameter ratio of about 1:2 to about 1:60.

Another embodiment the invention is an article of a decorative coating on a substrate; the decorative coating contains a film forming polymer and a pigment, wherein the pigment comprises particles that (1) comprise an organic polymer and further comprise a volume phase hologram; and (2) have thickness of about 1 micrometer to about 100 micrometers and an average diameter of about 10 micrometers to about 300 micrometers and a thickness to diameter ratio of about 1:2 to about 1:60.

BRIEF DESCRIPTION OF THE DRAWING

FIG. 3 shows the reflectance spectrum of a decorative coating containing the holographic flake pigment of this invention applied over a blue basecoat.

DETAILED DESCRIPTION OF THE INVENTION

Holographic Flake Pigment

Figure 1:
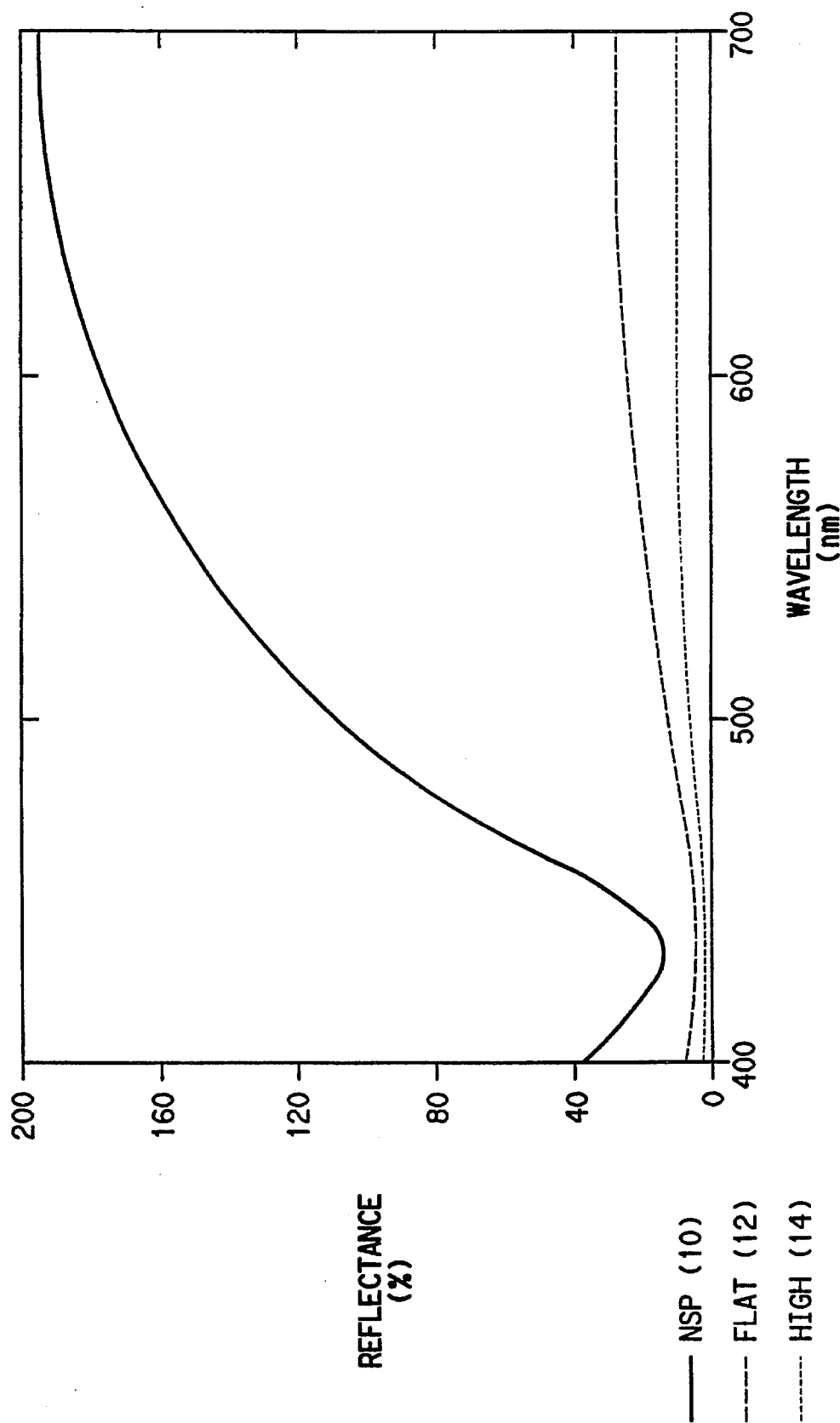
FIG. 1 shows the reflectance spectrum of a decorative coating containing conventional pearlescent flake pigment applied over a black basecoat.

The holographic flake pigment comprises particles that comprise an organic polymer and further comprise one or more volume phase holograms. The particles have a thickness of about 1 micrometer to about 100 micrometers, preferably about 5 to 30 micrometers, an average diameter of about 10 micrometers to about 300 micrometers, preferably, 10 to 150 micrometers, and a thickness to diameter ratio of about 1:2 to about 1:60 and preferably, about 1:30. A volume phase hologram is recorded in a photosensitive element, comprising a layer of photosensitive composition on a support. Following holographic exposure, the optical properties of the hologram may be modified by laminating a diffusion donor element to the layer of photosensitive material comprising the hologram. The hologram is then converted to particles of the appropriate size by grinding or an equivalent process.

As is well known to those skilled in the art, reflection holograms reflect only a narrow band of radiation at a given angle. Typically, if exposed object and reference beams are normal to the plane of the layer of photosensitive composition, then the reflected wavelength at normal incidence, is approximately the same as the wavelength used for exposure. As described herein, and in Smothers, U.S. Pat. Nos.

4,959,283 and 5,024,909, and Gambogi, U.S. Pat. No. 5,182,180, the wavelength and bandwidth of reflection may be modified. Thus, by appropriate selection of exposure conditions and by post exposure treatment of the hologram, it is possible to prepare holographic flake pigment that, unlike other flake pigments, reflects the desired range of visible radiation but does not reflect and scatter ultraviolet radiation. Photodegradation of the polymer matrix should be less of a problem with these materials than with other types of flake pigment since they do not increase the exposure of the matrix to ultraviolet radiation.

Unlike metallic flake pigments, holographic flake pigments are not subject to attack by corrosive atmospheres, so they do not cause spotting or staining of the coating in corrosive atmospheres. Further the wavelength of the reflected actinic radiation of the hologram depends on the angle of illumination so holographic flake pigment shows a high degree of "flop". The "flop" is not just a change from a light to dark color as occurs with conventional flake pigments but a change in the dominant wavelength of the color. Since the holographic pigment is an organic polymer, it is also more easily dispersed in the coating composition than is a metallic flake pigment.

Photosensitive Element

Holograms are conveniently recorded by photosensitive materials which produce a spatial pattern of varying refractive index, rather than optical density, when exposed to light. These materials are described in a number of references, such as, for example, L. Solymer and D. J. Cook, *Volume Holography and Volume Gratings,* Academic Press, New York, 1981, Chapter 10, pp. 254–304. Typically, the photosensitive material is present as a layer on a substrate which provides dimensional stability. In some cases, such as, for example, photopolymerizable compositions, a temporary release film, i.e., a coversheet, is typically also present.

Preferred photosensitive materials are photopolymerizable compositions. Photopolymerizable compositions useful for recording holograms are discussed in "Photopolymers for Holography and Waveguide Applications," by B. M. Monroe and W. K. Smothers, in *Polymers for Lightwave and Integrated Optics: Technology* and Applications, Part I: Foundations, L. A. Hornak, Ed., Marcel Dekker, New York, 1992, pp. 145–170. Preferred photopolymerizable compositions are disclosed in Keys, U.S. Pat. No. 4,942,102; Monroe, U.S. Pat. No. 4,942,112; and Smothers, U.S. Pat. No. 4,959,284. Particularly preferred compositions are disclosed in Trout, U.S. Pat. No. 4,963,471. In the preferred compositions either the monomer or the binder comprises one or more moieties selected from the group consisting of (1) aromatic moieties selected from the group consisting of (i) substituted or unsubstituted phenyl, (ii) substituted or unsubstituted naphthyl, and (iii) substituted or unsubstituted heterocyclic aromatic moieties having up to three rings; (2) chlorine; (3) bromine, and mixtures thereof; and the other constituent is substantially free of said moiety or moieties. Compositions in which the monomer contains said moiety are more preferred.

For systems in which the monomer contains said moiety and the binder is free of said moiety, preferred liquid monomers are: 2-phenoxyethyl acrylate, 2-phenoxyethyl methacrylate, phenol ethoxylate monoacrylate, 2-(p-chlorophenoxy)ethyl acrylate, p-chlorophenyl acrylate, phenyl acrylate, 2-phenylethyl acrylate, 2-(1-naphthyloxy)ethyl acrylate, o-biphenyl methacrylate, o-biphenyl acrylate, ethyl 1-benzoyl-2-vinyl-1-cyclopropane carboxylate and mixtures thereof. Preferred solid monomers, which may be used to advantage in combination with liquid monomers are: N-vinyl carbazole; 2,4,6-tribromophenyl acrylate or methacrylate; pentachlorophenyl acrylate or methacrylate; 2-naphthyl acrylate or methacrylate; 2-(2-naphthyloxy)ethyl acrylate or methacrylate; and mixtures thereof.

Preferred binders are poly(vinyl butyral) and poly(vinyl acetate). Particularly preferred are fluorine containing binders containing 3 to 23% by weight fluorine. Especially preferred are copolymers of tetrafluoroethylene and/or hexafluoropropylene with vinyl acetate, such the 82:18 (mole %) vinyl acetate/tetrafluoroethylene copolymer, and with vinyl acetate and vinyl alcohol. Other monomers may also be included in the fluorine containing binders.

If crosslinking of the photosensitive composition is desired, up to about five weight percent of at least one multifunctional monomer containing two or more terminal ethylenically unsaturated groups may be incorporated into the composition. The polyfunctional monomer must be compatible with the other components of the composition and is preferably a liquid. Suitable multifunctional monomers include di-(2-acryloxyethyl)ether of bisphenol A, ethoxylated bisphenol A diacrylate, and the like. A preferred crosslinking agent is ethoxylated bisphenol A diacrylate.

The initiator system comprises one or more compounds which directly furnish free-radicals when activated by actinic radiation. (By "actinic radiation" is meant radiation which is active to produce the free-radicals necessary to initiate polymerization of the monomeric material.) It can also comprise a plurality of compounds, one of which yields the free-radicals after having been caused to do so by another compound, or sensitizer, which is activated by the radiation. The photoinitiator system typically contains a photoinitiator and a sensitizer that extends the spectral response of the system to the wavelength of the actinic radiation, typically the visible or near infrared spectral region.

A large number of conventional initiator systems can be used. Photoreducible dyes and reducing agents; ketones; quinones; dye-borate complexes; and trichloromethyl triazines can be used to initiate photopolymerization. Useful discussions systems can be found in "Photopolymers: Radiation Curable Imaging Systems" by B. M. Monroe, in *Radiation Curing: Science and Technology,* S. P. Pappas, ed., Plenum, New York, 1992, pp. 399–440, and "Free Radical Polymerization" by K. K. Dietliker, in *Chemistry and Technology of UV and EB Formulation for Coatings, Inks, and Paints,* P. K. T. Oldring, ed.; SITA Technology, London, 1991; Vol. 3, pp. 1–525.

Preferred initiator systems are 2,4,5-triphenylimidazolyl dimers. These compounds are disclosed in: Chambers, U.S. Pat. No. 3,479,185; Cescon, U.S. Pat. No. 3,784,557; Dessauer, U.S. Pat. No. 4,311,783; and Sheets, U.S. Pat. No. 4,622,286. Preferred 2,4,5-triphenylimidazolyl dimers include CDM-HABI, i.e., 2-(o-chlorophenyl)-4,5-bis(m-methoxyphenyl)-imidazole dimer; o-Cl-HABI, i.e., 1,1'biimidazole, 2,2'-bis (o-chlorophenyl)4,4'5,5'-tetraphenyl-; and TCTM-HABI, i.e., 1H-imidazole, 2,5-bis(o-chlorophenyl)-4-[3,4-dimethoxyphenyl]-, dimer, each of which is typically used with a hydrogen donor.

Preferred sensitizers include those disclosed in: Baum and Henry, U.S. Pat. No. 3,652,275; Dueber, U.S. Pat. No. 4,162,162; Smothers, U.S. Pat. No. 4,917,977; and Monroe, U.S. Pat. No. 4,987,230. Particularly preferred sensitizers include the following: DEAW, i.e., cyclopentanone, 2,5 bis[4-(diethylamino)phenyl]methylene]-; JAW, i.e., cyclopentanone, 2,5-bis[(2,3,6,7-tetrahydro-1H,5H-benzo[i,j]quinolizin-9-yl)methylene]-; cyclopentanone, 2,5-bis[2-(1,3-dihydro-1,3,3-trimethyl-2H-indol-2-ylidene)ethylidene]; and cyclopentanone, 2,5-bis-[2-ethylnaphtho[1,2d] thiazol-2(1H)-ylidene)ethylidene]. Suitable hydrogen donors include: 2-mercaptobenzoxazole, 2-mercaptobenzothiazole, 4-methyl-4H-1,2,4-triazole-3-thiol, and the like. Other suitable hydrogen donor compounds, which are preferred for compositions which contain N-vinyl carbazole monomer, are 5-chloro-2-mercaptobenzothiazole; 2-mercaptobenzothiazole; 1H-1,2,4-triazole-3-thiol; 6-ethoxy-2-mercaptobenzothiazole; 4-methyl-4H-1,2,4-triazole-3-thiol; 1-dodecanethiol; and mixtures thereof.

Other components conventionally added to photopolymer compositions can be present to modify the physical properties of the recording medium, provided they are compatible with the composition and do not adversely affect the properties of the recording medium or the resulting hologram. Such components include: plasticizers, thermal stabilizers, optical brighteners, ultraviolet radiation absorbing material, adhesion modifiers, coating aids, pigments, dyes, and release agents.

The photopolymerizable compositions are substantially solid, i.e., dry films. The binder must be present in sufficient amount to form a film when the composition is coated. The photoinitiator system must be present in sufficient amount to initiate polymerization of the monomer on exposure to actinic radiation. The monomer must be present in sufficient amount to produce image differentiation, i.e., form a hologram, on polymerization.

Proportions of ingredients in the photopolymerizable composition will generally be within the following percentage ranges, based on the total weight of the composition: binder 25 to 90%, preferably 45 to 75%; monomer(s), 5 to 60%, preferably, 15 to 50%; plasticizer, 0 to 25%, preferably, 0 to 15%; photoinitiator system, 0.1 to 10%, preferably 1 to 7%; and optional ingredients, 0 to 5%, typically 1 to 4%.

The photopolymerizable compositions are typically used as a layer applied to a dimensionally stable support. The composition may be directly coated onto the support by any conventional method, or may be cast as a film and laminated to the support by conventional methods. In either case the support provides dimensional stability for the photopolymerizable composition. If the photopolymerizable composition is to be irradiated through the support, the support must be transparent to actinic radiation. Transparent supports that may be selected to advantage include: glass, polyethylene terephthalate film, poly(methyl methacrylate), polycarbonate, and cellulose triacetate. A preferred support material is polyethylene terephthalate film.

The photosensitive element comprising the photopolymerizable layer and support may also comprise a temporary release film, or coversheet, on the other side of the supported photopolymerizable layer. The coversheet, may be, for example, polyethylene, polypropylene, polyethylene terephthalate, etc. Conventional intermediate layers or coatings may be used to facilitate the adhesive and/or release characteristics needed for the photopolymerizable layer.

Exposure and Processing

The photosensitive composition must be imaged to produce a volume phase hologram. A volume phase hologram comprises a varying pattern of refractive index within the recording material. This varying refractive index pattern modifies the phase and subsequently the direction of light passing through it.

Although the coversheet may be removed prior to exposure, exposure is typically carried out with the coversheet in place. Alternatively, the coversheet may be removed and the photosensitive layer laminated to a temporary substrate, such as a piece of glass or a front surface mirror, prior to exposure. In this situation, the substrate functions as the coversheet. For holographic exposure of the photosensitive layer, coherent light sources, e.g., lasers, are required. Techniques for carrying out holographic exposures are well known to those skilled in the art. A useful discussion of holography is presented in "Holography" by C. C. Guest in *Encyclopedia of Physical Science and Technology*, Vol. 6, pp. 507–519, R. A. Meyers, Ed., Academic Press, Orlando, Fla., 1987.

Reflection holograms, i.e., holograms which are viewed in reflection, are formed by allowing two beams of coherent radiation, known as the object beam and the reference beam, to simultaneously enter the photosensitive layer from opposite sides so that they are traveling in approximately opposite directions. The interference between these beams is recorded by the photosensitive layer as a spatial pattern of varying refractive index.

Volume phase reflection holograms may be produced by a single-beam on-axis method wherein the reference beam is projected through the photosensitive layer onto an object therebehind. The reflected beam from the object becomes the object beam and interferes with the reference beam. Reflection holograms also may be produced by two-beam on-axis and off-axis methods wherein a reference beam is projected on one side of the photosensitive layer and an object beam is projected on the reverse side of the photosensitive layer. Reflection holograms produced by an off-axis process are disclosed in Hartman, U.S. Pat. No. 3,532,406.

For the production of holographic flake pigment any reflection hologram may be used, but holographic mirrors are preferred. A holographic mirror is the simplest reflection hologram. It can be created by splitting a laser beam and recombining the beams at the photosensitive layer (two-beam method). Alternatively, it can be created by projecting a laser beam through the photosensitive layer onto a mirror (single-beam method). The light reflected by the mirror becomes the object beam, reflecting and then interfering with the reference beam in the plane of the photosensitive layer. In one process, the coversheet is removed and a reflective film, such as aluminized polyethylene terephthalate, is laminated to the photosensitive layer with the aluminized side in contact with the holographic recoding material. Since the holographic recording material may adhere to the aluminized surface, this step is preferably carried out immediately prior to exposure. Holographic exposure is then carried out through the support. The reflective film acts as a mirror during exposure.

Preferred holographic flake pigments have a band center wavelength of about 380–1100 nm and have an effective bandwidth of about 10–200 nm. Also, preferably the holographic flake pigment specularly reflects light incident only from a limited solid angular region that is determined by the optical and spectral configurations used in recording the hologram in the organic polymer of the pigment. Other preferred pigments contain multiple single-beam or two-beam holograms or both. Other useful pigments have single-beam, mirror-like holograms in which the angle of maximum reflected light is other than the usual, mirror-like, specular reflectance angle and contains a mixture of single-beam, mirror-like reflecting holograms and two-beam holograms to provide a range of angular widths of the specular lobe. By specular lobe is meant the angular distribution of light about normal, mirror-like, specular reflectance direction.

As disclosed in Keys, U.S. Pat. No. 4,942,102, following holographic exposure, the photosensitive element may be exposed overall to actinic radiation. Coherent radiation is not required for the overall exposure. Exposure may be carried out with any convenient source of actinic radiation, such as a graphics arc light source, laser, sunlight, etc.

If the wavelength of reflection is to be modified as described below, overall exposure following holographic exposure may be carried out to only partly polymerize any remaining monomer or may be omitted entirely. Holograms with wider bandwidths are typically produced if overall exposure is omitted before the wavelength shifting step. However, if the modification step is to be omitted, overall exposure is preferred before the hologram is converted to pigment particles.

If the binder is poly(vinyl butyral), poly(vinyl acetate), or a copolymer of vinyl acetate with tetrafluoroethylene and/or hexafluoropropylene containing 3 to 23% by weight fluorine, the refractive index modulation of the hologram can be enhanced by heating to 100°–150° C. for about 1–90 minutes following overall exposure.

Following overall exposure and thermal processing the wavelength and bandwidth of the reflection hologram may be modified as described in Smothers, U.S. Pat. Nos. 4,959,283 and 5,024,909, and Gambogi, U.S. Pat. No. 5,182,180. A diffusion donor element is laminated to the surface of the reflection hologram. The diffusion donor element typically comprises a substantially solid diffusion layer that comprises a diffusion agent, a binder, and, optionally, a photoinitiator system. The diffusion layer is coated on a support. The diffusion agent is a material that can diffuse from the diffusion layer into the hologram, typically a liquid plasticizer or a liquid monomer.

Diffusion may be allowed to proceed at ambient temperature or may be carried out at an elevated temperature. The degree of swelling of the hologram caused by diffusion may vary across the thickness of the hologram. Thus, a diffusion gradient may be produced causing nonuniform fringe spacing and an increased bandwidth of light reflected by the hologram. The amount of diffusion can be controlled by variation of the amount of diffusion agent in the diffusion donor element, the diffusibility of the diffusion agent (typically a function of its molecular weight), the diffusion time, and the temperature at which the diffusion is carried out. If the diffusion agent is a monomer, the hologram may be fixed by overall exposure following diffusion. If desired, especially broad band reflection may be obtained by (1) laminating a diffusion donor element whose diffusion layer, preferably between 3 and 25 micrometers thick, comprises a binder, an initiator system, a plasticizer, and a polymerizable monomer that contains two or more acrylate and/or methacrylate groups, preferably a methacrylate or pentaerythritol triacrylate, and (2) rapidly heating the resulting laminate to 100°–150° C., preferably 120°–150° C., for at least 1 minute. By this process, holographic mirrors with reflection bandwidths (transmission optical density greater than or equal to 0.8) greater than about 50 nm may be prepared.

The support for the photosensitive layer is removed before the hologram is converted to pigment particles. If a diffusion element is present, the support for the diffusion element is also removed, but the diffusion layer may be left in place, if desired.

The hologram can be converted to pigment particles of the desired size by any conventional means, such as sand grinding, ball milling, attritor grinding, two roll milling, etc. One method that can be used to advantage is to cool the hologram below its glass transition, for example, in liquid nitrogen, before grinding with a pestle in a mortar that had been precooled with liquid nitrogen. Another method is to grind the hologram in cold water, such as in ice water. Alternatively, the grinding apparatus can be refrigerated to cool the hologram to below its glass transition temperature.

Following conversion to pigment particles, particles of the desired size may be separated by any conventional means, such as sieving, wet sieving or air classification. Particles that are too large may be separated and converted to the desired size.

The pigment particles have a thickness of about 1 micrometer to about 100 micrometers, an average diameter of about 10 micrometers to about 300 micrometers and a thickness to diameter ratio of about 1:2 to about 1:60. The thickness of the particle is determined by the thickness of the photosensitive layer in the photosensitive element plus the thickness of the shifting film (diffusion donor element), if present. A preferred range for pigment particles is an average thickness of about 5 micrometers to about 30 micrometers, an average diameter of about 10 micrometers to about 150 micrometers, and a thickness to diameter ratio of about 1:2 to about 1:30.

Decorative Coatings

The fluid coating composition of this invention contains: (a) a liquid medium; (b) a film forming binder; and (c) a holographic flake pigment dispersed in the liquid medium. The holographic flake pigment will typically comprises 0.5–2.0% by weight of the composition, although higher levels could be used, if desired. Preferably, the holographic flake pigment has an index of refraction equal to or within plus/minus 0.05 refraction units of the index of refraction of the film forming binder of the composition. Other ingredients that are conventional components of coating compositions may also be present provided the ingredient is compatible with the other ingredients of the composition and its presence does not adversely affect the properties of the composition.

The fluid coating composition containing the holographic flake pigment may be advantageously applied as mid-coat. The composition may be applied over a conventional pigmented base coat and covered with a conventional clear coat, i.e., a coating without pigments (as the top-coat). Alternatively, the holographic flake pigment, with or without additional conventional pigment or pigments, may be included in the basecoat. Alternatively, the coating comprising holographic flake pigment, with or without additional conventional pigment or pigments, can be used without a clear coat.

Whether or not the holographic flake pigment is used with other pigments and whether or not the coating comprising the holographic flake pigment is used with a basecoat and/or a clear coat will depend on the application. Conventional high quality automotive finishes, for example, typically comprise a clear coat over a colored basecoat.

When used in a mid-coat without added conventional pigment, the holographic flake pigment will typically comprises 0.5–5.0% by weight of the composition, although higher or lower levels could be used, if desired. Higher levels will be required when the holographic flake pigment is used in a coating composition that contains added conventional pigments and lower levels when used without other pigments.

Waterborne coating compositions are preferred for coating compositions containing holographic flake pigment. Some organic solvents may adversely affect the properties, especially the optical properties, of the holographic flake pigment. Waterborne coating compositions suitable for use as basecoats, as described below, will typically be suitable for use as decorative coatings comprising holographic flake pigment.

Basecoats

Conventional basecoats typically contain: (a) a liquid medium; (b) a film forming binder; and (c) a pigment dispersed in the liquid medium, including the holographic flake pigments.

The film-forming binder can comprise any of the film forming resins conventionally used as binders in coating compositions. Particularly useful binders include: fluorinated polymers, acrylic polymers, polyesters, alkyds, and polyurethanes.

Thermoplastic fluorinated polymers can be used such as polyvinyl fluoride, polyvinylidine fluoride, or copolymers and terpolymers thereof. One useful composition contains about 50–80% by weight polyvinylidine fluoride and 20–50% by weight of polyalkyl methacrylate. Useful waterborne basecoats are disclosed, for example, in Chang, U.S. Pat. No. 5,100,735, and Den Hartog, U.S. Pat. No. 5,006,413.

The acrylic polymers are copolymers of one or more alkyl esters of acrylic and/or methacrylic acid. One or more other ethylenically unsaturated monomers may also be present. These polymers may be of either the thermoplastic or thermosetting type.

Suitable alkyl esters of acrylic or methacrylic acid include esters in which the alkyl group contains 1–12 carbon atoms, preferably 1–8 carbon atoms, such as: methyl methacrylate, ethyl methacrylate, 1-propyl methacrylate, n-butyl methacrylate, n-pentyl methacrylate, methyl acrylate, ethyl acrylate, n-butyl acrylate, and 2-ethylhexyl acrylate, etc. Suitable ethylenically unsaturated monomers that may also be present include: vinyl aromatics, such as styrene and vinyl toluene; nitriles, such as acrylonitrile and methacrylonitrile; vinyl and vinylidene halides, such as vinyl chloride and vinylidene fluoride; and vinyl esters, such as vinyl acetate. If the polymer is of the thermosetting crosslinking type, suitable functional monomers are included. Typical functional monomers are hydroxy alkyl acrylates having 1–4 carbon atoms in the alkyl group, such as hydroxyethyl acrylate and methacrylate, hydroxypropyl acrylate and methacrylate; unsaturated carboxylic acids, such as acrylic acid and methacrylic acid; and polyisocyanates and blocked polyisocyanates.

Crosslinking agents such as monomeric and/or polymeric partially and/or fully alkylated melamine formaldehyde crosslinking agents, such as "Cymel" resins, usually are included. Particularly useful resins are the partially and fully alkylated melamine formaldehyde resins having 1–6 carbon atoms in the alkyl group. Organic polyisocyanate crosslinking agents also can be used.

Typical polyesters are formed from the condensation of: a polyol, such as pentaerythritol; a glycol; a monocarboxylic acid; an aromatic dicarboxylic acid; and an aliphatic carboxylic acid. Branched chain glycols, preferably those with 8 or fewer carbon atoms, such as neopentyl glycol and pinacol, may be used. The monocarboxylic acid is primarily used to control the molecular weight of the polymer. Any aromatic or saturated aliphatic carboxylic acid having 18 of fewer carbon atoms may be used. Typical acids are: benzoic, triethyl benzoic, toluic, acetic, propionic, stearic, lauric, pelargonic, etc. Preferred dicarboxylic acids are those with 4–12 carbon atoms, such as succinic, phthalic, isophthalic, terephthalic, etc.

Polyurethanes of the reaction product of a polyol and a polyisocyanate can be used. Polyurethanes of hydroxy containing acrylic polymers, hydroxyl containing polyesters or polyethers reacted with an organic polyisocyanate also can be used.

The use of conventional ingredients is well known to those skilled in the art. Each ingredient, if present, is used to modify the composition in conventional form and in the amount required to achieve the desired effect without adversely affecting the properties of the composition. Such ingredients include, for example: ultraviolet stabilizers, thickeners and rheology control agents, wetting agents, defoamers, surfactants, pigment dispersants, biocides, etc.

To improve the weatherability of the finish, about 0.1–5% by weight, based on the weight of the binder, of a photostabilizer or combination of stabilizers may be added. Stabilizers are disclosed in Barsotti, U.S. Pat. No. 5,093,391, column 5, line 16, to column 6, line 28. Typical photostabilizers include: o-hydroxybenzophenones, such as 2,4-dihydroxybenzophenone and 2,4-dihydroxy-3',5'-di-t-butylbenzophenone; triazines, such as 3,5-dialky-4-hydroxyphenyl triazine derivatives; triazoles, such as 2-(2'-hydroxyphenyl) benzotriazole; benzoates, such as octylphenyl benzoate; hindered amines, such as derivatives of 4-hydroxy-2,2,6,6,-tetramethylpiperidine; nickel compounds, such as bis(phenyldithiocarbamato)nickel(II); etc. Other conventional photostabilizers are well known to those skilled in the art.

Thickeners and rheology control agents can be added in amounts of about 0.5–5% by weight of the coating composition to provide the desired spray viscosity. Typical agents are: acrylic polymers such as polyacrylic acid, clays, cellulosics, urethanes, etc.

The pigmented basecoat contains conventional pigments in a pigment to binder ratio of 1:100–50:100. Any of the conventional pigments used in coating compositions may be used in the basecoat. These include, for example: metallic oxides, such as titanium dioxide, zinc oxide, and iron oxide; chromates, such as lead chromate; carbon black; silica; talc; china clay; organometallics, such as copper phthalocyanine; organic pigments, such as quinacridones and azo pigments; etc. Numerous other conventional pigments are well known to those skilled in the art.

The pigments are formulated into a mill base by mixing the pigments with a dispersing resin which may be the same as the binder of the composition or may be another compatible dispersing resin or agent. The pigment dispersion is formed by conventional means such as sand grinding, ball milling, attritor grinding, two roll milling, etc. The mill base is then blended with the binder to form the coating composition.

The substrates over which the basecoat is applied are those conventionally used for automobile and truck bodies such as: cold roll steel, phosphatized steel, polyester reinforced fiber glass, reaction injection molded urethane, crystalline amorphous polyamide, and the like. Typically these substrates are coated with a pigmented layer of alkyd resin primer, polyester primer, epoxy resin primer, and the like. Conductive primers, useful when it is desired to prepare a conductive surface for electrostatic spraying, are described in Mirabeau, U.S. Pat. No. 5,114,756. The primer typically is about 12 to about 75 micrometers thick.

The coating composition may be applied to the substrate by conventional techniques, such as: spraying, electrostatic spraying, dipping, brushing, flowcoating, and the like. After coating, the composition is dried at ambient temperature or baked at elevated temperature to allow solvent to evaporate before the clear coat is applied. Typical clear coat/basecoat finishes have a clear coat about 25–50 micrometers thick and a basecoat of about 5–50 micrometers thick.

Clear Coat

The clear coating used contains a liquid medium and a film forming binder. Any of the aforementioned film forming binders used for the base coat such as acrylic polymers, polyesters, alkyds and polyurethanes and the melamine or polyisocyanate crosslinking agents can be used. The clear coating composition maybe solvent or waterborne. Typically, the composition can contain any of the aforementioned photo stabilizers or combinations of stabilizers, thickeners and rheology control agents. Small amounts of transparent pigments can be used to improve durability and weatherability of the clear coat. It may be possible to incorporate some holographic flake pigment in to the clearcoat.

One useful clear coating composition is shown in Harper U.S. Pat. No. 5,215,783 issued Jun. 1, 1993.

INDUSTRIAL APPLICABILITY

Holographic flake pigments are useful for the preparation of decorative coatings that can be used to emphasize the lines and contours of a three dimensional surface. These pigments are particularly useful for the preparation of exterior finishes for automobiles. The pigments also can be used in molded plastics to provide a decorative appearance, in tiles and the like.

The advantageous properties of this invention can be observed by reference to the following examples which illustrate, but do not limit, the invention. All parts and percentages are on a weight basis unless otherwise indicated.

EXAMPLES

| GLOSSARY | |
|---|---|
| Brij ® 30 | Polyoxyethylene(4) lauryl ether; CAS 5274-68-0 |
| o-Cl-HABI | Biimidazole, 2,2'-bis[o-chlorophenyl]-4,4',5,5'-tetraphenyl-; CAS 7189-82-4 |
| Cyasorb ® W-24 | 2,2' Dihydroxy-4-methoxybenzophenone; CAS 131-53-3 |
| Elvacite ® 2051 | Poly(methyl methacrylate); MW 350,000; E. I. du Pont de Nemours and Company, Wilmington, DE |
| FC-430 | Fluorad ® FC-430; fluoroaliphatic polymeric esters; CAS 11114-17-3; 3M Company, St. Paul, MN |
| JAW | Cyclopentanone, 2,5-bis[(2,3,6,7-tetrahydro-1H,5H-benzo[i,j]quinolizin-9-yl)methylene]- |
| MMT | 4-Methyl-4H-1,2,4-triazole-3-thiol; CAS 24854-43-1 |
| Photomer ® 4039 | Phenol ethoxylate monoacrylate; CAS 56641-05-5; Henkel, Ambler, PA |
| Sartomer 349 | Ethoxylated bisphenol A diacrylate; CAS 24447-78-7; Sartomer, West Chester, PA |
| TAOBN | 1,4,4-Trimethyl-2,3-diazobicyclo-(3.2.2)-non-2-ene-2,3-dioxide |
| Tinopal ® SFG | 3-Phenyl-7-[2'-(4'-N,N-diethylamino)-6'-chloro-1',3',5'-triazinylamino]-coumarin; Ciba-Geigy, Hawthorne, NY |
| Tinopal ® PCR | 2-(Stilbyl)-(naphtho-1',2',4,5)-1,2,3-trizol-2"-sulfonic acid phenyl ester; CAS 6994-51-0; Ciba-Geigy, Ardsley, NY |
| TMPTMA | Trimethylolpropane trimethacrylate |
| TEOTA | Triacrylate ester of ethoxylated trimethylolpropane |
| Vinac ® B-15 | Poly(vinyl acetate); MW 90,000; CAS 9003-20-7; Air Products and Chemicals, Allentown, PA |

Example 1

Binder

The binder was a vinyl acetate/tetrafluoroethylene copolymer containing about 78% by weight vinyl acetate and about 22% by weight tetafluoroethylene, prepared by a process similar to that described in Trout, U.S. Pat. No. 4,963,471. Inherent viscosity about 1.45 (0.2% in tetrahydrofuran).

Holographic Recording Material

A coating solution containing the following was made up in 75:25 2butanone/toluene (All percentages are % by weight of total solids): 66.0% binder; 17.0% Photomer® 4039; 3.0% Sartomer 349; 7.9% N-vinyl carbazole; 3.7% o-CL HABI; 2.1% MMT; 0.2% FC-430; and 0.1% JAW. It should by understood that "total solids" refers to the total amount of non-volatile components in the composition even though some of the components may be non-volatile liquids rather than solids at room temperature. JAW was dissolved in dichloromethane (about 32.5 g of dichloromethane/g of JAW) prior to addition. All subsequent operations on coating solutions or resulting films were performed under red lights.

The solution was filtered. A web coater equipped with an extrusion dye, 3.7 m drier set at 50°–70° C., and a laminator station was used to coat the solution onto an about 50 micrometers thick support of clear polyethylene terephthalate. A coversheet of about 23 micrometers thick polyethylene terephthalate was laminated to the coating as it emerged from the drier to produce a photosensitive element consisting of coversheet, holographic recording material, and support. The holographic recording material was about 20 micrometers thick.

Exposure

Immediately prior to holographic exposure, the coversheet was removed from the holographic recording material. A 50 micrometers thick piece of aluminized polyethylene terephthalate was laminated to the holographic recording material in its place with the aluminized side in contact with the holographic recording material. The holographic recording material was exposed through the support using the apparatus described in Armstrong, U.S. Pat. No. 4,995,685. Imaging was carried out at 514 nm using an exposure of about 40 mJ/cm2 at normal incidence. The holographic recording material was then overall exposed to about 150 mJ/cm2 of ultraviolet and visible light.

Processing

The aluminized polyethylene terephthalate was removed from the exposed holographic recording material. An about 8 micron thick diffusion element was laminated to it. The diffusion element had the following composition (% by weight): Elvacite® 2051, 32.4%; Vinac® B-15, 12.64%; TMPTMA, 35.55%; TEOTA, 7.90%; o-Cl HABI 1.58%; 2-mercaptobenzoxazole, 0.71%; Tinopol® PCR, 0.20%; Tinopol® SFG, 0.99%; Cyasorb® W-24, 0.08%; Brij® 30, 7.9%; hydroquinone, 0.05%; and TAOBN, 0.03%. The laminate of diffusion element and holographic recording material was heated in an oven at about 120° C. for about 0.5 hr. Heating was carried out in an oven with good air circulation so that the laminate was heated rapidly to 120° C.

The resulting holographic mirror had a reflection bandwidth (optical density greater than or equal to 0.8) of about 80 nm. The band was centered at about 592 nm.

Pigment Preparation

The diffusion element support was carefully removed from the exposed and processed holographic recording material. The hologram was carefully peeled from the support. The resulting polymer layer, consisting of the exposed and processed holographic recording material and diffusion layer was cooled in liquid nitrogen. The cooled polymer layer was placed in a mortar that had been precooled with liquid nitrogen and ground with a pestle. The holographic recording material was initially broken into large flakes. More liquid nitrogen was added and additional grinding carried out.

The ground holographic recording material was wet sieved. It was placed on a wire mesh screen stack and washed with a large volume of water. Particles less than about 38 micrometers (0.0015 in; 400 mesh screen sieve) were discarded. Particles greater than about 38 micrometers and less than about 76 micrometers (0.003 in; 200 mesh screen size) were collected. Particles greater than about 76 micrometers were dried and ground again.

Preparation of Coating

Tri-coated panels were prepared. To form the basecoats, conventional waterborne basecoats containing pigment, acrylic latex, and dispersant resin were sprayed onto primed aluminum panels. A midcoat containing about 1.5% of holographic flake pigment was prepared in a conventional waterborne system similar to that used in the basecoat. The midcoat was applied in two coats and flashed for 10–30 min. A conventional polyurethane clear coat was sprayed over the midcoat and baked and then sanded and recoated with the clear to provide a film build that was 35–50 micrometers thick.

One coating containing conventional pearl flake and two coatings containing holographic flake were prepared. A mid-coat containing the pearl flake was sprayed over a base coat containing black. A mid-coat containing holographic flake was sprayed over two base coats, one containing black and one containing blue. In each case, a clear top-coat was then applied.

Evaluation of Coatings

Reflectance spectra were measured using the spectrophotometer similar to that described in Lee, U.S. Pat. No. 4,412,744. Reflectance spectra were measured at near specular or NSP (i.e., 45° illumination and −30° viewing) flat (i.e., 45° illumination and 0°, surface normal, viewing) and high (i.e., 45° illumination and 65° viewing) positions. The measured values are referenced to a white diffuse reflecting standard.

FIG. 1 shows the reflectance spectra of a mid-coat containing conventional pearl flake over a black base coat. This pearl flake was used as a comparison panel because it nearly matches the color of the holographic flake (i.e., the pearl flake over black has a hue angle of about 90° and the holographic flake over black has a hue angle of about 100°. Hue angles are in CIE L* a* b* color space derived using a CIE D65 source and a CIE 10 degree standard observer. The pearl flake is made with materials (e.g., TiO2) which have high indices of refraction relative to that of the vehicle (e.g., 2.2 versus 1.5). The interfaces between the flake and the vehicle mostly scatter the incident light at angles that are not equal to the specular reflectance angle. The effects of this non-specular scattered light is most noticeable on the NSP curve (10) at 410 to 450 nm where the reflectance value averages about 20%. The flat (12) and high (14) curves in the 600 to 700 nm region have reflectances of 30 and 12% respectively. If the light reflected to these two positions comes from a scattered (i.e., diffuse) reflected component the light observed at the flat (i.e., 65° viewing) position would be about 0.42 (i.e., cosine 65°) of the value reflected to the flat, surface normal, viewing position. Indeed, the 12% reflectance of (14) is 0.4 of the 30% value reflected in the direction of the surface normal (12).

Figure 2:
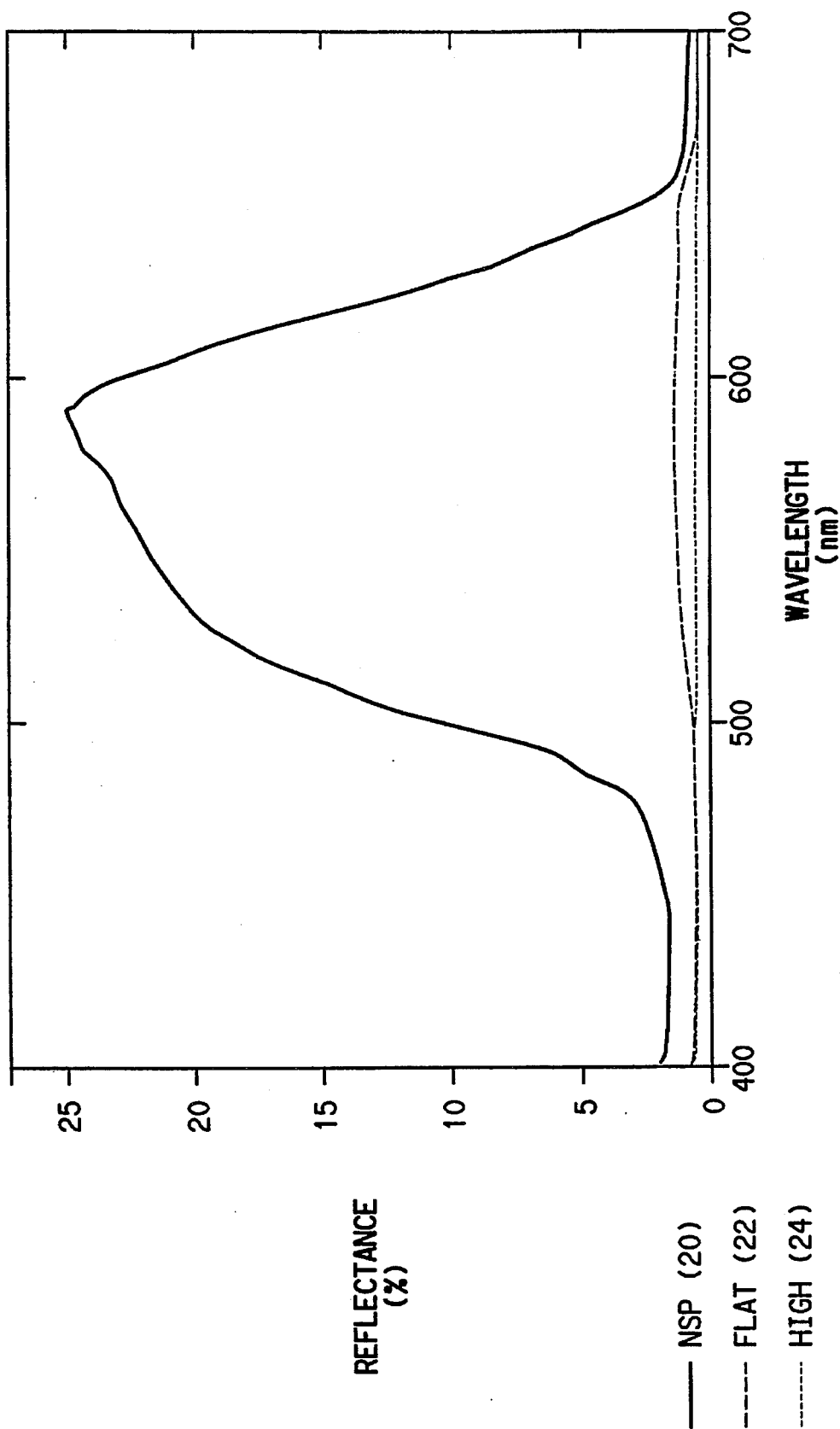
FIG. 2 shows the reflectance spectrum of a decorative coating containing the holographic flake pigment of this invention applied over a black basecoat.

FIG. 2 shows the spectra of the holographic flake midcoat over a black base coat. The holographic polymer has almost the same index of refraction as the vehicle. Therefore, very little scattering occurs at the vehicle-flake interface. This lack of scattering is illustrated by comparing the ratio of the maximum NSP (10) and high (14) reflectances of the conventional pearl flake to that of the maximum ratio for the holographic flake panel (i.e. curves 20 and 24). The pearl panel has a 15 to 1 ratio while the holographic panel has a ratio of 43 to 1. At the flat (24) viewing position, the holographic flake is essentially transparent and most of the light is being reflected by the black base coat (e.g., a blacker base coat would result in a ratio higher than the 43 noted above).

FIG. 3 illustrates the above point by showing the spectra for the holographic flake over a blue base coat. At NSP (30), the hue angle is little changed from that of the holographic flake over black, 105° for curve 30 versus 100° for curve 20. At the flat (32) and high (34) viewing positions, the flake has become substantially transparent and the blue base coat is the principal reflecting element. At these viewing positions the hue angle of the spectra has shifted by about 180° to 286° for the flat (32) viewing the position and 283° for the high (34) viewing the position. None of the currently manufactured non-holographic flake pigment can be fabricated into panels that show such a dramatic hue shift.

The above experimental measurements thus demonstrate that the holographic flake does not substantially scatter light into angular regions outside the desired specular reflectance angular region, while the pearl flake does substantially scatter light into angular regions outside the designed specular reflectance angular region.

Having described the invention, we now claim the following and their equivalents.

What is claimed is:

1. In a fluid coating composition adapted for the preparation of decorative coatings, said composition comprising (a) a liquid medium; (b) a film forming polymer dispersed or dissolved in the liquid medium; and (c) a holographic pigment dispersed in said liquid medium, the improvement wherein: said holographic pigment comprises particles that (1) comprise an organic polymer having a volume hologram recorded in the organic polymer; (2) have a thickness of about 1 micrometer to about 100 micrometers; (3) have an average diameter of about 10 micrometers to about 300 micrometers, wherein said average diameter of the particles is defined to be that which is determined by sieving operations and which is expressed in micrometers; and (4) the thickness to diameter ratio of said flake particles is about 1:2 to about 1:60.

2. The coating composition of claim 1 wherein said holographic pigment has an index of refraction that is equal to or within plus/minus 0.05 refraction units of the index of refraction of the film forming polymer in said coating composition.

3. The coating composition of claim 2 wherein said volume hologram comprises a reflection hologram and has a reflection bandwidth greater than 50 nm.

4. The coating composition of claim 1 wherein the liquid medium of said coating composition is water.

5. The coating composition of claim 1 wherein said organic polymer is formed from a photosensitive precursor comprising a monomer, a binder, and a photoinitiator system, wherein said binder is present in sufficient amount to form a film when the composition is coated; said photoinitiator system is present in sufficient amount to initiate polymerization of the monomer on exposure to actinic radiation; and said monomer is present in sufficient amount to produce image differentiation on polymerization.

6. The coating composition of claim 5 wherein said binder is selected form the group consisting of poly(vinyl butyral), poly(vinyl acetate), and fluorine containing binders containing 3 to 23% by weight fluorine.

7. The coating composition of claim 6 wherein said particles have a thickness of about 5 micrometers to about 30 micrometers, an average diameter of about 10 micrometers to about 150 micrometers, and a thickness to diameter ratio of about 1:2 to about 1:30.

* * * * *